(12) United States Patent
Zhao et al.

(10) Patent No.: US 11,934,662 B2
(45) Date of Patent: Mar. 19, 2024

(54) SOLID STATE STORAGE SYSTEM WITH DATA LOSS PREVENTION AND USER ALERT

(71) Applicant: Innogrit Technologies Co., Ltd., Shanghai (CN)

(72) Inventors: Gang Zhao, Chandler, AZ (US); Wei Jiang, Fremont, CA (US); Lin Chen, Cupertino, CA (US)

(73) Assignee: Innogrit Technologies Co., Ltd., Shanghai (CN)

( * ) Notice: Subject to any disclaimer, the term of this patent is extended or adjusted under 35 U.S.C. 154(b) by 222 days.

(21) Appl. No.: 17/515,596

(22) Filed: Nov. 1, 2021

(65) Prior Publication Data
US 2023/0133278 A1 May 4, 2023

(51) Int. Cl.
*G06F 3/06* (2006.01)
*G06F 1/30* (2006.01)
*G06F 21/88* (2013.01)
*G11C 5/14* (2006.01)

(52) U.S. Cl.
CPC .............. *G06F 3/0619* (2013.01); *G06F 1/30* (2013.01); *G06F 3/0634* (2013.01); *G06F 3/0679* (2013.01); *G06F 21/88* (2013.01); *G11C 5/141* (2013.01); *G11C 5/144* (2013.01)

(58) Field of Classification Search
CPC ........ G06F 3/0619; G06F 1/30; G06F 3/0634; G06F 3/0679; G06F 21/88; G06F 1/3212; G06F 12/16; G06F 13/1668; G06F 13/24; G11C 5/141; G11C 5/144; G11C 16/0483; G11C 16/30; G11C 5/148; G11C 16/32; G11C 16/3418; G11B 33/06; G11B 33/10; G11B 33/12
See application file for complete search history.

(56) References Cited

U.S. PATENT DOCUMENTS

| | | | | |
|---|---|---|---|---|
| 9,164,929 | B2* | 10/2015 | Blount | G06F 3/0625 |
| 11,687,292 | B2* | 6/2023 | Goss | G06F 3/0685 |
| | | | | 711/103 |
| 2014/0103955 | A1* | 4/2014 | Avritch | G01R 31/64 |
| | | | | 324/764.01 |
| 2016/0118121 | A1* | 4/2016 | Kelly | G06F 1/28 |
| | | | | 710/301 |
| 2017/0068488 | A1* | 3/2017 | Shibatani | G11C 16/10 |
| 2017/0242467 | A1* | 8/2017 | Kelly | G06F 11/0709 |
| 2018/0032390 | A1* | 2/2018 | Rahmanian | G06F 11/0754 |
| 2018/0365147 | A1* | 12/2018 | Fevrier | G06F 12/0868 |
| 2020/0004971 | A1* | 1/2020 | Secatch | G06F 3/0656 |

(Continued)

*Primary Examiner* — Faisal M Zaman
(74) *Attorney, Agent, or Firm* — IPro, PLLC

(57) ABSTRACT

Systems, apparatus and methods are provided for managing a removable solid state storage system for data loss prevention. A method may include maintaining a standby mode for a timer of the removable solid state storage system until the removable solid state storage system is disconnected from an external power supply, setting an operation time interval on the timer, using the timer to count how long the removable solid state storage system has been disconnected, sending an interrupt to a storage controller of the removable solid state storage system from the timer when the timer counts to the operation time Interval, and performing data loss prevention operations using a power supplied by a removable battery.

18 Claims, 2 Drawing Sheets

(56) References Cited

U.S. PATENT DOCUMENTS

| | | | |
|---|---|---|---|
| 2020/0020360 A1* | 1/2020 | Kosuru | G11C 16/10 |
| 2021/0231720 A1* | 7/2021 | Butler | G01R 31/64 |
| 2021/0247920 A1* | 8/2021 | Kottila Veettil | G06F 3/0644 |
| 2021/0303199 A1* | 9/2021 | Horspool | G06F 3/0614 |
| 2022/0011949 A1* | 1/2022 | Goto | G06F 11/1456 |

* cited by examiner

SOLID STATE STORAGE SYSTEM WITH DATA LOSS PREVENTION AND USER ALERT

TECHNICAL FIELD

The disclosure herein relates to data loss prevention for solid state storage devices, particularly relates to data loss prevention for removable solid state storage devices.

BACKGROUND

The evolution of the modern computing system is driven in-part by the emergence of the solid state drives (SSD) that have demonstrated higher performance of speed and latency over the traditional hard drives. Unlike hard drives that depend on the magnetism to store data, solid state drives use NAND flash devices to achieve data storage. The NAND flash devices are a family of integrated circuits that are manufactured by advanced process and assembly technologies to achieve multiple levels of 3D vertical stacking of storages units into a small footprint of die and package for high capacity of storage.

Meanwhile, the increased storage capacity with new NAND flash process technology evolutions such as triple-level cell (TLC) and quadruple-level cell (QLC) has also introduced new challenges of reduced reliability and decreased data retention time. For example, for QLC NAND flash devices, the data retention time usually ranges from two to three months, which makes it mandatory for the firmware to refresh NAND storage blocks every 30 to 60 days to prevent data loss.

The removable solid state drives are expected to be disconnected from the power supply for a long period of time from months to years without any data loss. Without power supply, a removable solid state drive is unable to perform NAND refresh to prolong the data retention time. As a result, a removable solid state drive with QLC NAND flash devices will end up losing data after a few months of being disconnected from the USB power supply. Therefore, data loss issue has limited mass adoption of removable solid state drives.

SUMMARY

The present disclosure provides a novel removable solid state storage system and method with data loss prevention and user alert functions. The system may include a timer, a wireless module and a removable battery in a removable solid state drive. The removable battery may provide dedicated power supply to the removable solid state drive to perform NAND storage refresh at a time interval set by the timer. The method may include data refresh back-up schemes and a user alert scheme to suggest action items to the user for preventing potential data loss.

In one exemplary embodiment, there is provided an apparatus that may comprise an external connection interface, a timer, a removable battery, one or more non-volatile memory devices and a storage controller. The timer may be configured to maintain a standby mode when the external connection interface is connected to an external power supply, set an operation time interval, count how long the external connection interface has been disconnected, and send an interrupt to the storage controller when the timer counts to the operation time Interval. The storage controller may be coupled to the timer, the removable battery and the one or more non-volatile memory devices, and configured to activate upon receipt of the interrupt, and perform data loss prevention operations on data stored in the one or more non-volatile memory devices using a power supplied by the removable battery.

In another exemplary embodiment, there is provided a method for managing a removable solid state storage system for data loss prevention. The method may comprise: maintaining a standby mode for a timer of the removable solid state storage system until the removable solid state storage system is disconnected from an external power supply, setting an operation time interval on the timer, using the timer to count how long the removable solid state storage system has been disconnected, sending an interrupt to a storage controller of the removable solid state storage system from the timer when the timer counts to the operation time Interval, and performing data loss prevention operations using a power supplied by a removable battery.

DETAILED DESCRIPTION

Figure 1:
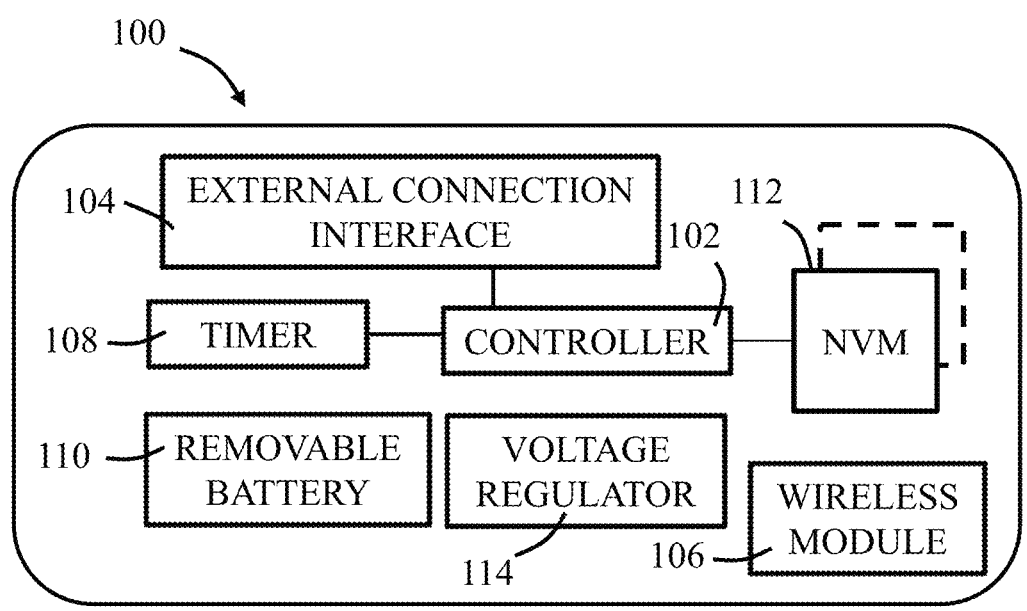
FIG. 1 schematically shows a removable solid state storage system in accordance with an embodiment of the present disclosure.

Specific embodiments according to the present disclosure will now be described in detail with reference to the accompanying figures. Like elements in the various figures are denoted by like reference numerals for consistency.

The present disclosure provides systems and methods for preventing data loss in non-volatile memory device based storage systems. As used herein, a non-volatile memory device may be a computer storage device that can maintain stored information after being powered off, and the stored information may be retrieved after being power cycled (turned off and back on). Non-volatile storage memory devices may include NAND flash memories, NOR flash memories, magnetoresistive random Access Memory (MRAM), resistive random access memory (RRAM), phase change random access memory (PCRAM), Nano-RAM, etc. In the description, a NAND flash may be used as an example to demonstrate data loss prevention techniques. However, various embodiments according to the present disclosure may implement the techniques with other types of non-volatile storage devices.

FIG. 1 schematically shows a removable solid state storage system 100 in accordance with an embodiment of the present disclosure. The removable solid state storage system 100 may comprise a storage controller 102, an external connection interface 104, a wireless module 106, a timer 108, a removable battery 110, a voltage regulator 114 and one or more non-volatile memory (NVM) devices 112. In one embodiment, the removable solid state storage system 100 may be a removable solid state drive (SSD) or a portable SSD.

The NVM devices 112 may provide non-volatile data storage for the removable solid state storage system 100. In some embodiments, the NVM devices 112 may be one or more NAND flash devices. In some other embodiments, the NVM devices 112 may be one or more other types of non-volatile storage devices, for example, NOR flash memories, magnetoresistive random Access Memory (MRAM), resistive random access memory (RRAM), phase change random access memory (PCRAM), Nano-RAM, etc.

The external connection interface 104 may be part of the removable solid state storage system 100 to connect the removable solid state storage system 100 to a host system, which also provides an external power supply to the removable solid state system. For example, the external connection interface 104 may be a PCIe to USB bridge for connecting the removable solid state storage system 100 to a USB port of a host system. The voltage regulator 114 may be configured to adapt the power provided by a power source (e.g., the removable battery 110 or a USB connection) for circuits of the removable solid state storage system 100. In some embodiments, the removable solid state storage system 100 may have more than one voltage regulator.

The storage controller 102 may be configured to control and manage the NVM devices 112 and other components of the removable solid state storage system 100. In some embodiments, the storage controller 102 may implement functionalities of a solid state drive (SSD) controller, and also data loss prevention operations. The data loss prevention operations may include data retention operations and user notifications, and the data retention operations may further include data refresh and data back-up operations. In at least one embodiment, the removable solid state storage system 100 may include firmware that includes executable instructions to manage the removable solid state storage system 100. For example, the storage controller 102 may comprise a computer processor (e.g., a microprocessor or a microcontroller) configured to execute the executable instructions of the firmware to perform various operations for managing data in the NVM devices 112 (e.g., regular operations of an SSD controller and data loss prevention operations).

The wireless module 106 may connect the removable solid state storage system 100 to a user device and perform user alert functions under the control of the storage controller 102. In one example embodiment, the wireless module may be a WiFi controller, or a Bluetooth controller, and a combination of both WiFi and Bluetooth controllers. The timer 108 and the removable battery 110 may be used to perform data refresh and back-up operations under the control of the storage controller 102 when the removable solid state storage system 100 is disconnected from an external power supply (e.g., a host system).

The timer 108 may manage the time intervals between successive data retention and user alert operations. The time intervals may also be referred to as operation time intervals. In an embodiment, the timer 108 may remain at a standby mode while removable solid state storage system 100 may be connected to an external power supply (e.g., a USB port) and may be turned on (e.g., start counting time) once the removable solid state storage system 100 is disconnected from the power supply. The timer 108 may stay on (e.g., keep counting) while the removable solid state storage system 100 is disconnected and send an interrupt signal to the storage controller 102 once the end of a pre-set time interval has reached (or end of the time interval depending on whether the timer counts from zero to the time interval or from the time interval to zero). The interrupt may activate the storage controller 102 to perform the data retention operations.

While the interrupt is asserted to the storage controller 102, the timer 108 may be reset and re-start counting time again. Another interrupt may be sent to the storage controller 102 after the counted time reaches the time interval again. The operations of re-starting to count time and sending an interrupt may be repeated as long as the removable solid state storage system 100 is disconnected from any external power supply.

The time interval between successive data retention operations may depend on a variety of factors that represent the reliability and retention time of the solid state storage device 104. These factors may include the device type such as triple-level cell (TLC) or quadruple-level cell (QLC), the program/erase (P/E) cycle counts, the page error count and the program time. In one embodiment, the time interval for QLC NAND flash devices may be set around 30 to 60 days, while for TLC it may be a few years. A large P/E cycle count or page error count may be indicators that a solid state storage device may have entered the late stage of its lifetime, and thus a smaller interval between data loss prevention operations may be needed to ensure data retention.

In some embodiments, the removable battery 110 may provide a dedicated power supply to the removable solid state storage system 100 for the data loss prevention operations. The battery may be designed to be removable so that the user has the convenient option to replace it. In one embodiment, the battery level of the removable battery 110 may also be reported to the storage controller 102 and reported to a user via the wireless module 106, such that the user may be notified in a timely manner of further necessary actions or pending risks.

The backup battery 110 may be recharged in place, or recharged after being removed. In one example embodiment, the removable battery 110 may be a button cell battery with nominal voltage of 3V to 3.3V. In another example embodiment, the removable battery 110 may be rechargeable while the removable solid state storage system 100 is connected to an external power supply.

In various embodiments, the data loss prevention operations may include data refresh and data back-up. In some embodiments, the removable solid state storage system 100 may also be configured to send notifications via the wireless module 106 to a user (e.g., by wireless connections such as Bluetooth, 3G/4G/5G or other wireless technology) using Simple Text Message (SMS), E-mail or mobile application in-app messages. In such embodiments, in addition to data refresh and back-up, the data loss prevention operations may also include user notifications.

In a data refresh operation, the storage controller 102 may read data from the one or more NVM devices 112, correct errors through controller's ECC schemes and re-program the data into the NVM devices 112. In a data back-up operation, in contrast, the storage controller 102 may read data from the one or more NVM devices 112, correct errors through controller's ECC schemes and program the data to a second location of the NVM devices 112. As a result, a second copy of the data may be retained at a different physical block after a back-up operation. In some embodiments, for the data retention operations, the storage controller 102 may be configured (e.g., by firmware) to prioritize and selectively back-up data for the operating system, critical programs and important user data.

In embodiments that provide user notifications, the user notification operations may be performed at the same or different intervals as the refresh and back-up operations. Exemplary notifications may include the battery level of the backup battery 110, and one or more suggested action items, such as, but not limited to, connecting the removable solid state storage system 100 to an external power supply or replacing the removable battery 110 to prevent potential data loss.

Figure 2:
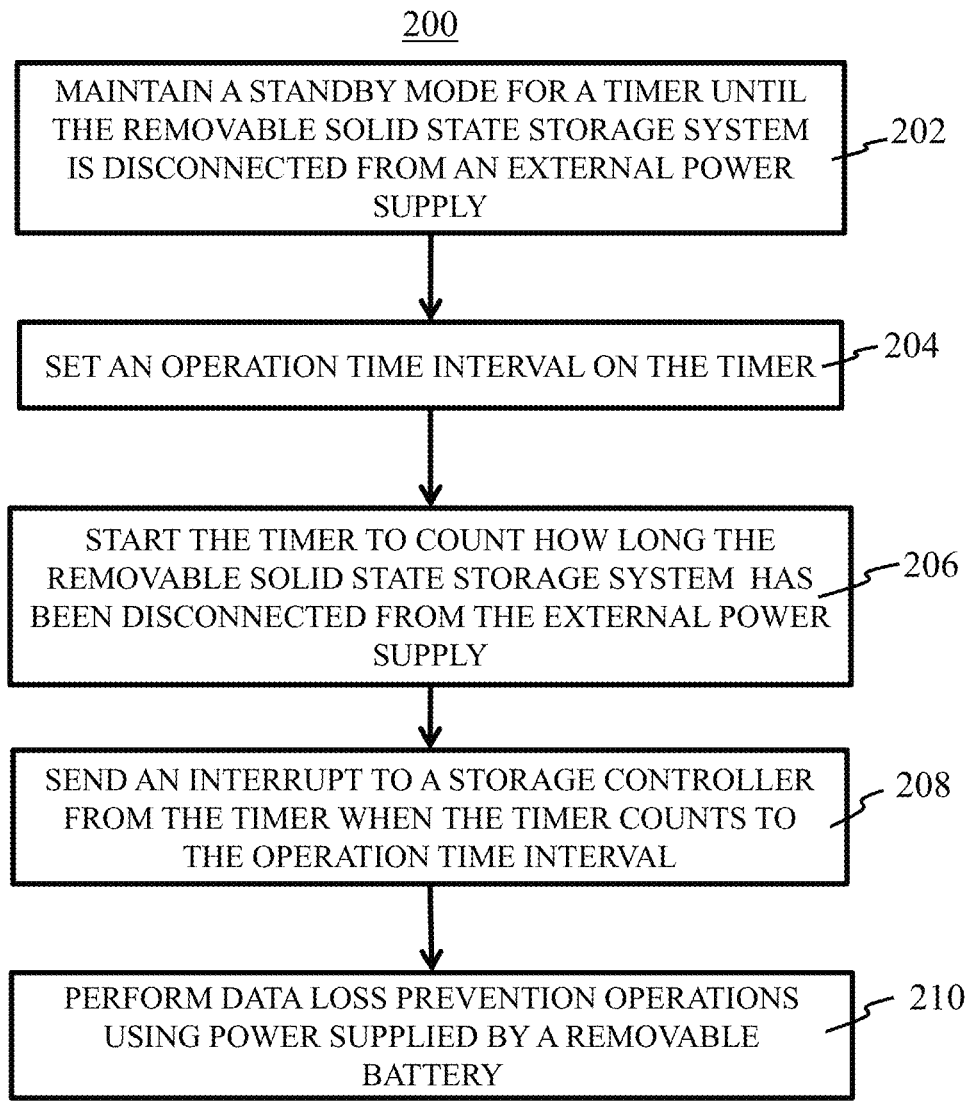
FIG. 2 is a flowchart of a process for conducting data loss prevention of a removable solid state storage system in accordance with an embodiment of the present disclosure.

FIG. 2 is a flowchart of a process 200 for conducting data loss prevention of a removable solid state storage system in accordance with an embodiment of the present disclosure. At block 202, a timer of a removable solid state storage system may be maintained at a standby mode until the removable solid state storage system is disconnected from an external power supply. For example, as long as the removable solid state storage system 100 is connected to an external power supply, such as a USB port of a host system, the timer 108 of the removable solid state storage system 100 may be kept at a standby mode.

At block 204, an operation time interval may be set for the timer. For example, the timer 108 may be set with an operation time interval. In some embodiments, the operation time interval may be pre-configured and set before the removable solid state storage system 100 is disconnected from an external power supply. In some other embodiments, the operation time interval may be set when the removable solid state storage system 100 is disconnected from an external power supply.

At block 206, the timer may be started to count how long the removable solid state storage system has been disconnected from the external power supply. For example, the timer 108 may start to count once the removable solid state storage system is unplugged from an external power supply. In some embodiments, the timer 108 may count up (e.g., from zero counting towards the time interval). In some other embodiments, the timer 108 may count down (e.g., from the time interval counting towards zero).

At block 208, an interrupt may be sent to a storage controller from the timer when the timer counts to the operation time interval. For example, when the timer 108 counts to the value of the operation time interval, an interrupt may be generated by the timer 108 and sent to the storage controller 102. At block 210, data loss prevention operations may be performed using power supplied by a removable battery. In some embodiments, the data loss prevention operations may include data refresh and back-up operations to be performed by the storage controller 102 for data stored in the NVMs 112. In at least one embodiment, the data loss prevention operations may further include issuing user notifications (e.g., SMS, email, and/or mobile app messages).

In some embodiments, when the timer finishes counting for one operation time interval, the timer may then continue counting towards the next operation cycle. For example, the timer 108 may start counting again for the next operation cycle after the interrupt has been sent or the data loss prevention operations have been performed. And the data loss prevention operations may be performed again after another operation time interval.

In some embodiments, once the removable solid state storage system is connected to an external power supply in the middle of any time interval, the timer may be sent back to the standby mode and stop counting.

In one exemplary embodiment, there is provided an apparatus that may comprise an external connection interface, a timer, a removable battery, one or more non-volatile memory devices and a storage controller. The timer may be configured to maintain a standby mode when the external connection interface is connected to an external power supply, set an operation time interval, count how long the external connection interface has been disconnected, and send an interrupt to the storage controller when the timer counts to the operation time Interval. The storage controller may be coupled to the timer, the removable battery and the one or more non-volatile memory devices, and configured to activate upon receipt of the interrupt, and perform data loss prevention operations on data stored in the one or more non-volatile memory devices using a power supplied by the removable battery.

In one embodiment, the data loss prevention operations may include refresh and back-up the data stored in the one or more non-volatile memory devices.

In one embodiment, the apparatus may further comprise a wireless module, and the data loss prevention operations may further include sending one or more user notifications via the wireless module.

In one embodiment, for the data loss prevention operations, the storage controller may be further configured to prioritize and selectively back-up the data stored in the one or more non-volatile memory devices for an operating system, critical programs and important user data.

In one embodiment, the storage controller may be further configured to use the timer to count how much time has passed since the data loss prevention operations have been performed and use another interrupt from the timer to activate the storage controller to repeat the data loss prevention operations.

In one embodiment, the removable battery may be a rechargeable battery and recharged when the external connection interface is connected to any external power supply.

In one embodiment, the removable battery may be a button cell battery with nominal voltage of 3V to 3.3V.

In one embodiment, the operation time interval may be determined based on a variety of factors that represent a reliability and retention time of the one or more non-volatile memory devices.

In one embodiment, when the removable solid state storage system may be connected to another external power supply in the middle of any time interval, the timer is sent back to the standby mode and stops counting.

In one embodiment, the external connection interface may be a PCIe to USB bridge.

In another exemplary embodiment, there is provided a method for managing a removable solid state storage system for data loss prevention. The method may comprise: maintaining a standby mode for a timer of the removable solid state storage system until the removable solid state storage system is disconnected from an external power supply, setting an operation time interval on the timer, using the timer to count how long the removable solid state storage system has been disconnected, sending an interrupt to a storage controller of the removable solid state storage system from the timer when the timer counts to the operation time Interval, and performing data loss prevention operations using a power supplied by a removable battery.

In one embodiment, the data loss prevention operations may include refresh and back-up data stored in one or more non-volatile memory devices of the removable solid state storage system.

In one embodiment, the data loss prevention operations may further include sending one or more user notifications.

In one embodiment, for the data loss prevention operations, the storage controller may be configured to prioritize and selectively back-up data for an operating system, critical programs and important user data.

In one embodiment, the method may further comprise using the timer to count how much time has passed since the data loss prevention operations have been performed and sending another interrupt to activate the storage controller to repeat the data loss prevention operations.

In one embodiment, the removable battery may be a rechargeable battery and recharged when the removable solid state storage system is connected to any external power supply.

In one embodiment, the removable battery may be a button cell battery with nominal voltage of 3V to 3.3V.

In one embodiment, the operation time interval may be determined based on a variety of factors that represent a reliability and retention time of the one or more non-volatile memory devices.

In one embodiment, the method may further comprise sending the timer back to the standby mode and stopping counting when the removable solid state storage system is connected to any external power supply in the middle of any time interval.

In one embodiment, the removable solid state storage system may be connected to the external power supply via a PCIe to USB bridge.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus, comprising:
    a connection interface;
    a timer configured to:
        when the connection interface is connected to any external power supply, maintain a standby mode,
        when the connection interface is disconnected from any external power supply, count how long the connection interface has been disconnected and send an interrupt to a storage controller when the timer counts to an operation time Interval;
    a battery;
    one or more non-volatile memory devices; and
    the storage controller coupled to the timer, the battery and the one or more non-volatile memory devices, the storage controller configured to:
        activate upon receipt of the interrupt, and
        perform data loss prevention operations on data stored in the one or more non-volatile memory devices using power supplied by the battery, wherein the data loss prevention operations include refreshing and backing up the data stored in the one or more non-volatile memory devices.

2. The apparatus of claim 1, further comprising a wireless module, wherein the data loss prevention operations further include sending one or more user notifications via the wireless module.

3. The apparatus of claim 1, wherein for the data loss prevention operations, the storage controller is further configured to prioritize and selectively back up the data stored in the one or more non-volatile memory devices for an operating system, critical programs and important user data.

4. The apparatus of claim 1, wherein the storage controller is further configured to use the timer to count how much time has passed since the data loss prevention operations have been performed and use another interrupt from the timer to activate the storage controller to repeat the data loss prevention operations.

5. The apparatus of claim 1, wherein the battery is a rechargeable battery and the apparatus is configured to recharge the battery when the connection interface is connected to any external power supply.

6. The apparatus of claim 1, wherein the battery is a button cell battery with nominal voltage of 3V to 3.3V.

7. The apparatus of claim 1, wherein the operation time interval is a function of one or more factors that represent a reliability and retention time of the one or more non-volatile memory devices.

8. The apparatus of claim 1, wherein, upon the connection interface being connected to any external power supply, the timer is back reset, enters the standby mode and stops counting.

9. The apparatus of claim 1, wherein the connection interface is a PCIe to USB bridge.

10. A method for managing a solid state storage system for data loss prevention, comprising:
    maintaining a standby mode for a timer of the solid state storage system until the solid state storage system is disconnected from any external power supply;
    setting an operation time interval on the timer;
    using the timer to count how long the solid state storage system has been disconnected from any external power supply;
    sending an interrupt to a storage controller of the solid state storage system from the timer when the timer counts to the operation time Interval; and
    performing data loss prevention operations using power supplied by a battery; wherein the data loss prevention operations include refreshing and backing up data stored in one or more non-volatile memory devices of the solid state storage system.

11. The method of claim 10, wherein the data loss prevention operations further include sending one or more user notifications.

12. The method of claim 10, wherein for the data loss prevention operations, the storage controller is configured to prioritize and selectively back up data for an operating system, critical programs and important user data.

13. The method of claim 10, further comprising using the timer to count how much time has passed since the data loss prevention operations have been performed and sending another interrupt to activate the storage controller to repeat the data loss prevention operations.

14. The method of claim 10, wherein the battery is a rechargeable battery and recharged when the solid state storage system is connected to any external power supply.

15. The method of claim 10, wherein the battery is a button cell battery with nominal voltage of 3V to 3.3V.

16. The method of claim 10, wherein the operation time interval is a function of one or more factors that represent a reliability and retention time of the one or more non-volatile memory devices.

17. The method of claim 10, further comprising, upon the solid state storage system being connected to any external power supply, resetting the timer, sending the timer to the standby mode and stopping counting.

18. The method of claim 10, wherein the solid state storage system is connected to the external power supply via a PCIe to USB bridge.

* * * * *